Oct. 17, 1967 Z. CUNNINGHAM 3,347,998

TELEPHONE HANDSET HOLDER

Filed Aug. 16, 1966

INVENTOR.
ZED CUNNINGHAM

BY

Robert G. McMorrow
ATTORNEY

United States Patent Office 3,347,998
Patented Oct. 17, 1967

3,347,998
TELEPHONE HANDSET HOLDER
Zed Cunningham, 2696 E. 55th St., Cleveland, Ohio 44104
Filed Aug. 16, 1966, Ser. No. 572,750
4 Claims. (Cl. 179—157)

ABSTRACT OF THE DISCLOSURE

A holder for a telephone handset or like article having a saddle assembly with individually positioned elements, one of the elements engaging the handset for opposite positioning thereof, and a pivotal chin rest.

This invention relates to supporting devices finding particular utility in connection with communications equipment, and more particularly to a cross bar apparatus for holding a telephone handset, or the like, during use.

It has been previously proposed to employ various holding means for telephone handsets or receivers during use, the essential purpose of such prior devices being to make it unnecessary for the user of the telephone to hold the receiver and to thereby free his hands for other duties. Many of these previous devices comprise more-or-less permanent attachments to the telephone receiver, rendering their use without the attachment inconvenient if not impossible, and all effectively limit the use of the receiver to a single preselected position. The heretofore proposed apparatus has further failed to prove helpful to handicapped persons, being difficult to initially position on the body. To overcome these objections, and to provide additional advantages hereinafter set forth, the present invention provides a support adapted for body attachment in alternative positions permitting maximum support for the telephone receiver and being extremely unlikely to become accidentally dislodged in use.

A primary object of the invention resides in the provision of a support as aforesaid which includes at least one pivotal portion whereby the support is adapted for application to either shoulder of the user of the apparatus.

Another objective of the invention concerns the provision of an appliance of the type described above which includes a chin rest. Related to this objective is that of providing a device wherein the chin rest is pivotal to opposed sides for changes in location of the device.

Yet a further object is to provide a telephone receiver support which is of special utility to handicapped persons, and one which is normally body-attached but is also usable on a supporting surface such as a table or the like.

A still further object is to provide a body-attached telephone support wherein maximum stability of the support is achieved in use, thereby permitting its employment during movement of the body and leaving both of the hands of the wearer free for other activities.

Other and further objects and advantages of the invention will become apparent to those skilled in the art from a consideration of the following specification, when read in conjunction with the annexed drawing, in which.

Figure 1:
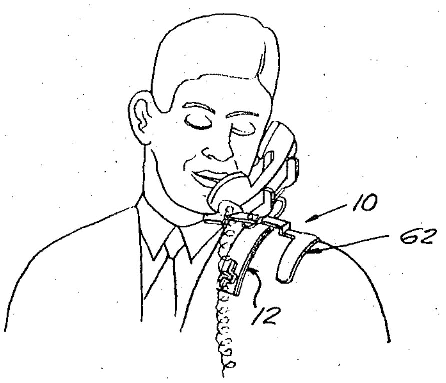
FIGURE 1 is a perspective view of a device constructed in accordance with the teachings of this invention, the device being located on the lefthand shoulder of a wearer.
Figure 2:
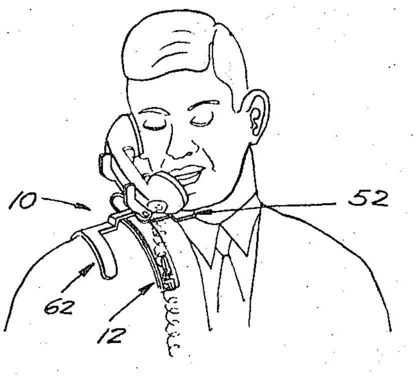
FIGURE 2 is a view similar to FIGURE 1, but showng the components of the invention device as manipulated to a second alternative position permitting the device to be worn on the right shoulder of the user.

Referring to the drawing in more detail, a support appliance comprising a preferred embodiment of the present invention is therein shown and designated by reference numeral 10. The device 10 is adapted for attachment on either shoulder of the wearer in the manner shown in FIGURES 1 and 2.

A main structural component of the invention is its main saddle element 12 formed of metal, plastic, or other suitable material as is the remainder of the device. The saddle element comprises a generally inverted, U-shaped portion having a rear leg 14 and elongated front leg 16 and adapted to fit over the shoulder of a wearer in the manner indicated in FIGURES 1 and 2. The extreme end 18 of the front leg 16 has connected thereto, either integrally or otherwise, a reverted portion 20 which overlies the outer surface of the front leg 16. The reverted section 20 extends over the front leg 16 and a portion of the rear leg 14 and terminates at a rebent section 22. It will be observed that the main saddle element is relatively wide, and thus its ends 18 and 24 are adapted to serve as a stand for supporting the device 10 on a flat surface such as a table top or the like (not shown).

Figures 3, 4, 5:
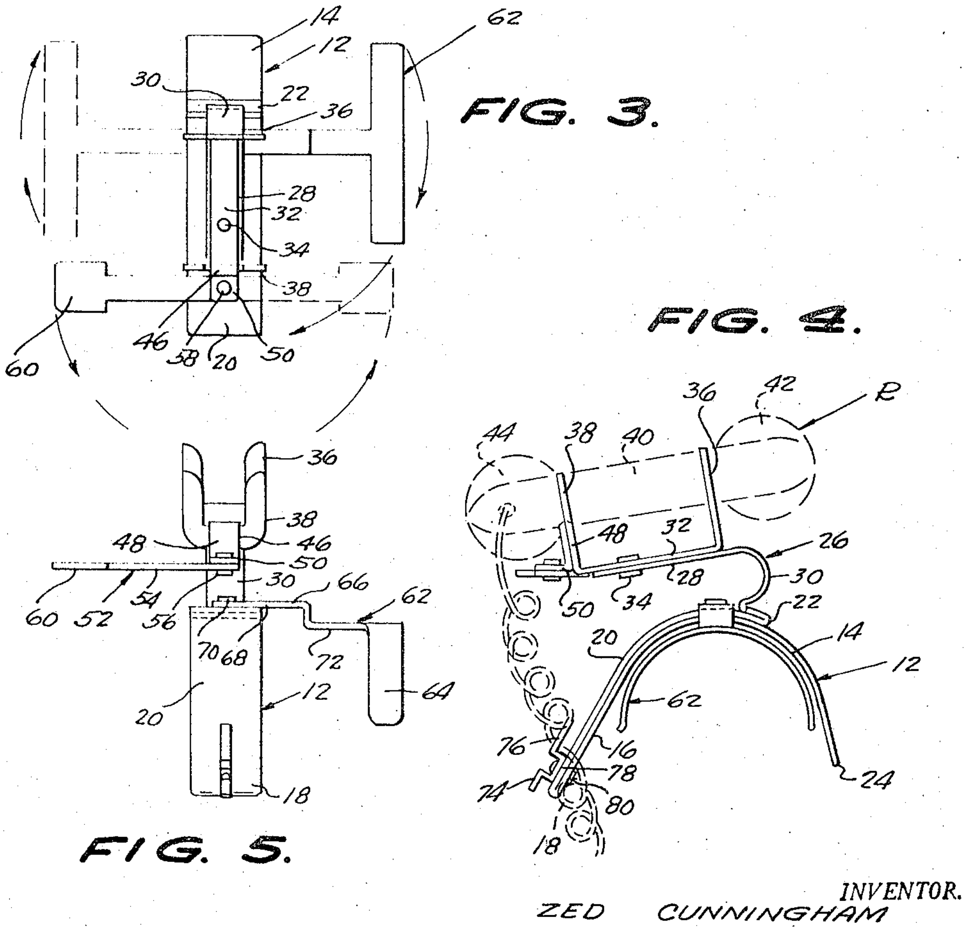
FIGURE 3 is an enlarged top elevational view of the components showing, in phantom lines, alternative positioning of the components.
FIGURE 4 is a side elevational view of the device.
FIGURE 5 is a front elevational view.

A receiver support leg 26 is provided and includes an arm section 28 with an arcuate connecting leg 30 joined, either integrally or otherwise, to the reverted section 22 of the main saddle element. The main extent of the arm 28 projects forwardly over the front leg 16 of the main saddle element, as best shown in FIGURE 4 of the drawing. A plate 32 is secured, as by a rivet 34 to extend over the arm 28 and project forwardly thereof. At its opposite ends, the plate 32 has upstanding, generally U-shaped members 36, 38, defining together a cradle for a telephone handset R of the type having a central section 40, an earpiece 42, and a mouthpiece 44. The central section of the handset R is disposed between the arms of the U-shaped members 36 and 38, with the mouthpiece and earpiece thereof extended on either side of said members.

Struck outwardly from the member 38 is a bracket 46 comprising a leg member 48 and foot member 50.

A chin rest member 52 forms an important component of the invention and includes a support 54, the proximal end 56 of which is pivotally secured to the foot member 50 by a pivot element 58. An enlarged plate 60, comprising the support for the chin of the user, is secured at the distal end of the support, and the manner of movement of the support to its alternative positions is shown in FIGURE 3.

To adapt the device 10 for application to either shoulder of the wearer, and to achieve the maximum stability of the support when worn, a secondary saddle element 62 is provided. The secondary saddle element comprises a generally inverted, U-shaped saddle 64 connected to the main saddle element by a link element 66 having a first stage 68 pivotally connected to the main saddle at 70, and a second outer stage 72 located in a depressed plane with respect to the first stage to account for the normal slope in the shoulder of the wearer.

Referring to FIGURE 4, it will therein be observed that a cord support clip 74 is provided, including a cord retaining arm 76, and a central section 78 connected by a rivet 80 to the front leg 16 of the main saddle element and its overlying plate 20.

In operation, the device supports a telephone handset R as set forth above, with the cord C thereof looped into the cord retaining clip 74 and preferably under the retaining portion 76 thereof. If the device is to be changed for opposite hand use, assuming the elements to be initially in the solid line position of FIGURE 3, the chin rest 52 is first pivoted in a counterclockwise position to its dotted line location in that figure and the secondary saddle element 62 is then pivoted in a clockwise direction to its second location. This effectively reverses the usable position of the apparatus. The provision of dual saddle elements, in association with a chin rest and cord clip virtually eliminates the danger of the device dropping from the user's shoulder, and by reason of the changeable positioning of both the chin rest and the secondary saddle element, the device is readily adapted for use on either shoulder of the wearer.

Having described and illustrated an embodiment of this invention in some detail, it will be understood that this description and illustration have been offered only by way of example, and that the invention is to be limited in scope only by the appended claims.

What is claimed is:

1. A shoulder attached holder for a telephone handset or the like, the holder comprising:

a main saddle element adapted for engagement over the shoulder and having first and second leg portions;

a secondary saddle element, including an arm member, the arm being pivotally secured to the first saddle element whereby the secondary saddle element is adapted for positioning in opposite locations with respect to the main saddle element;

a handset support secured to the main saddle element and holding a handset in either of two opposite positions; and a chin assembly, including a support pivotally secured to the holder.

2. The invention of claim 1, wherein:

the chin rest support is pivoted to the handset support.

3. The invention of claim 2, and:

a cord support clip on the main saddle element.

4. The invention of claim 3, wherein the telephone handset is of the type having a central section, a mouthpiece, and an earpiece, and wherein:

the handset support includes two upstanding, U-shaped members, the central section of the telephone handset being located between said members, and the earpiece and mouthpiece being on opposite sides thereof.

References Cited

UNITED STATES PATENTS

| | | | |
|---|---|---|---|
| 1,304,718 | 5/1919 | Townsend | 179—157 |
| 2,822,433 | 2/1958 | Sanford | 179—157 |

WILLIAM C. COOPER, *Primary Examiner.*